H. YOUNG.
Machine for Sawing Stone.

No. 224,760. Patented Feb. 17, 1880.

Witnesses: John Becker, Jno. K. Haynes

Inventor: Hugh Young by his Attorneys Brown & Brown

UNITED STATES PATENT OFFICE.

HUGH YOUNG, OF NEW YORK, N. Y.

MACHINE FOR SAWING STONE.

SPECIFICATION forming part of Letters Patent No. 224,760, dated February 17, 1880.

Application filed July 11, 1879.

*To all whom it may concern:*

Be it known that I, HUGH YOUNG, of the city, county, and State of New York, have invented certain new and useful Improvements in Machines for Sawing Stone, of which the following is a description, reference being had to the accompanying drawings, forming part of this specification.

This invention relates more particularly to machines for sawing stone, in which saws armed with diamonds, borts, or other hard stones or minerals are used; but the invention, in part or in whole, is not necessarily restricted to such description of saws.

The invention consists in certain novel constructions and combinations of parts whereby a reciprocating saw-sash moving along guides has combined with it means for feeding and withdrawing the saw toward or away from said guides; also, means for transmitting a push or lift motion to the blade or blades when stretched between carriers movable within the sash for the purpose of such feeding and withdrawal without disturbing the position of either carriers or sash for the purpose of such transmission of the lift motion to the blade; also, mechanism for communicating to the saw its several motions and adjustments in a simple and efficient manner.

Figure 1:
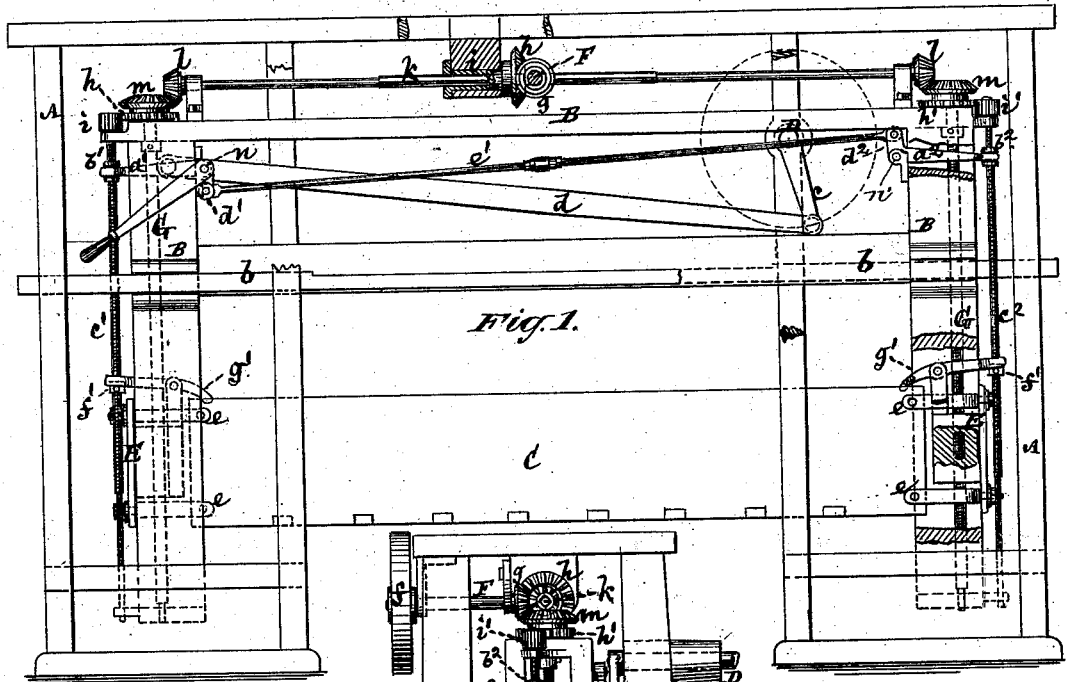
Figure 2:
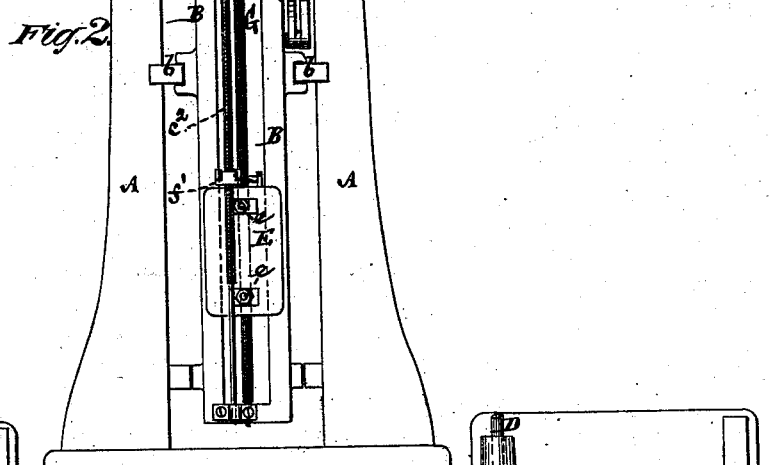
Figure 3:
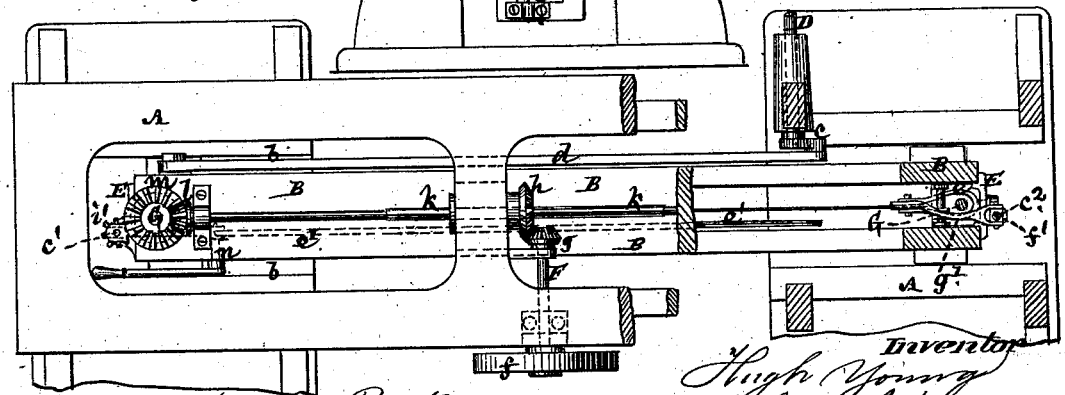

In the accompanying drawings, Figure 1 represents a partly-broken side view of a stone-sawing machine constructed in accordance with the invention; Fig. 2, an end view of the same, and Fig. 3 a partly-broken plan thereof.

A indicates the fixed frame of the machine, and B the reciprocating saw gate or sash. C is the saw-blade, preferably armed with diamonds, borts, or other hard stones. As here represented, these parts are arranged to provide for a reciprocating movement of the blade in an approximately-horizontal direction and its sides in a vertical plane; but the machine might be arranged to effect the cut in other directions—as, for instance, by arranging the saw to reciprocate up and down or with its sides in an oblique or horizontal plane.

The sash B is arranged to reciprocate on or along slides or guides $b\,b$, which form portions of or attachments to the fixed frame. It has its reciprocating motion communicated to it through any suitable mechanism—such, for instance, as the rotating shaft D, having its bearings in the fixed frame, the crank $c$, and connecting-rod $d$.

The blade C is not carried directly by the sash, but by carriers E E, which are arranged so as to be capable of a synchronous movement within the ends of the sash, or, in other words, of a movement in directions at right angles, or thereabout, to the reciprocating movement of the sash to effect the feed and withdrawal of the blade, and this without affecting or interfering with the parallelism of the blade to the guides $b\,b$.

The blade C is attached to the carriers E E by means of tension buckles or straps $e\,e$.

To provide for the above-described feeding of the blade toward and into and for its withdrawal from the stone, (the stone, as the machine is here represented, being placed below the blade,) the following combination of mechanism is or may be used: F is a rotating shaft arranged on one side of the fixed frame. This shaft carries a bevel-pinion, $g$, which gears with a bevel-pinion, $h$, fast to a sleeve, $i$, having its bearings in or on the fixed frame. Said sleeve $i$ and pinion $h$ are fitted on a square or feathered shaft, $k$, arranged in direction of the reciprocating motion of the sash B, and having its bearings in or on the latter, so that while the pinion $h$ serves to rotate said shaft the latter is free to slide through it.

Fast upon the opposite ends of the shaft $k$ are bevel-pinions $l\,l$, which gear with bevel-pinions $m\,m$ on feed-screws G G. These screws fit nuts or female threads in the carriers E E, and, accordingly as they are turned, serve to feed or withdraw the blade. This feed and withdrawal movement may be effected independently and quickly—as, for instance, through the pulley $f$—for bringing the blade into position for or away from its work, or be made to work with slow and adjustable feed through a ratchet or other mechanical means.

When a push or lift motion is to be given to the blade without giving any like motion to the blade-carriers, or to the sash, or to the guides which give direction to the reciprocating motion of the sash, (as is the case in the machine here shown,) the tension buckles or straps $e\,e$, which stretch the blade between the carriers E E, are made susceptible of rocking or flexion, and the power for producing the push or lift motion in the blade may be brought to some fixed point or points in the sash, as to the shaft $n$, by any suitable means. In such case I employ mechanism for transmitting the power from said point or shaft in the sash to the blade stretched between the carriers movable within said sash.

This mechanism may be constructed substantially as follows: On the shaft $n$ is an arm, $a'$, which engages with or between a collared portion, $b'$, of a screw, $c'$, fitted so as to be capable of sliding up and down through bearings at one end of the sash B. A similar sliding screw, $c^2$, is fitted to the opposite end of the sash, and the shaft $n$ has a crank, $d'$, which is connected, by a rod, $e'$, with a crank, $d^2$, on a shaft, $n'$, at the same end of the sash as the screw $c^2$. This shaft $n'$ is connected, by an arm, $a^2$, with a collared portion, $b^2$, of the screw $c^2$. By these means, accordingly as the shaft $n$ is vibrated, will the two sliding screws $c'$ $c^2$ be raised or lowered. These screws have nuts $f'$ $f'$ fitted on them, and said nuts have levers $g'$ engaging with them. These levers have their fulcrums on the blade-carriers E E, and are arranged so that when the nuts $f'$ $f'$ are raised by the sliding motion of the screws $c'$ $c^2$, through the vibrating of the shaft $n$ in one direction, the blade is kept against the stone and is disengaged from the stone through the vibrating of the shaft $n$ in another direction.

In the machine here described the tension of the saw-blade produces its disengagement from contact with the work during the return stroke on the withdrawal of the push above described.

To keep this communication of power for the push or lift motion in the same relation to the blade, whatever said blade's position within the sash, the screws are geared by wheels $h$ $i$ and $h'$ $i'$ with the screws $c'$ $c^2$, on which are the nuts $f'$ $f'$, in such manner that said nuts are moved at the same rate of speed as the carriers E E, said wheels being of diameters corresponding with the pitch of the screws G G and $c'$ $c^2$, respectively, so as to produce such result.

I do not, however, confine myself to the above means of communicating the power for the push or lift motion to the blade when fed within the sash, as other systems of devices may produce the same result; nor do I confine myself to the use of any fulcrum for such power on the sash other than the feed-screws for blade-carriers, or their equivalents, as the tension-screws $c'$ $c^2$ or their equivalents may be actuated from the fixed frame of the machine without the fulcrum point or shaft $n$ on the sash herein described, or any equivalent thereof.

What I claim as my invention, and desire to secure by Letters Patent, is—

1. In machines for sawing stone, the combination, with a reciprocating saw gate or sash, of means for feeding and withdrawing the saw-blade toward or away from the guides governing its reciprocating motion without impairing the parallelism of the saw-blade to said guides, substantially as specified.

2. In machines for sawing stone, the combination, with a reciprocating saw gate or sash and a saw-blade fed or withdrawn within said sash toward or away from the guides governing the reciprocating motion of the sash, of means for imparting a push or lift motion to said blade thus arranged to be fed within the sash without imparting any corresponding motion to the carriers between which the blade is stretched, to the sash, or to the guides governing its reciprocating motion.

3. The combination, with the reciprocating sash B, of the carriers E E, arranged to be fed and withdrawn at, or nearly at, right angles to the reciprocating motion of the sash, and the blade C, stretched between said carriers, essentially as and for the purposes specified.

4. The combination of the sash B, the guides $b$ $b$, along which said sash reciprocates, the blade C, the carriers E E, the feed-screws G G, and mechanism for conjointly operating said screws, essentially as described.

5. The combination, with the sleeve $i$, of the sliding and rotating shaft $k$, the reciprocating sash B, the carriers E E, the feed-screws G G, and the gears $l$ $l$ $m$ $m$, substantially as shown and described.

6. The combination, with the reciprocating sash, of carriers for the saw adjustable in a transverse relation with the reciprocating movement of said sash and means, preferably consisting of yielding tension devices or straps, connecting the saw with the carriers, so as to admit of imparting a push or lift motion to the saw independently of said movable carriers, essentially as described.

7. The combination, with the saw-sash arranged to reciprocate on or along guides, and with carriers for the saw adjustable within said sash toward or from the guides, of a shaft or actuating device having a fixed position on the sash and mechanism for transmitting motion therefrom to the saw-blade to effect a push or lift motion of the latter.

8. The combination of the yielding saw tension devices or straps $e$ $e$ with the carriers E E in the sash B, the levers $g'$ $g'$, and the sliding screws $c'$ $c^2$, essentially as and for the purposes specified.

9. The combination, with the reciprocating saw-gate and its adjustable saw-carriers E E, of the feed-screws G G, the screws $c'$ $c^2$, in gear with said feed-screws, and mechanism for straining and relaxing the saw by the action of the screws $c'$ $c^2$, substantially as specified.

HUGH YOUNG.

Witnesses:
CHANDLER HALL,
T. J. KEANE.